Jan. 23, 1968    G. N. LEVESQUE    3,365,711
HYDROSTATIC BEARING LOAD SIGNALING DEVICE
Filed April 8, 1965    4 Sheets-Sheet 1

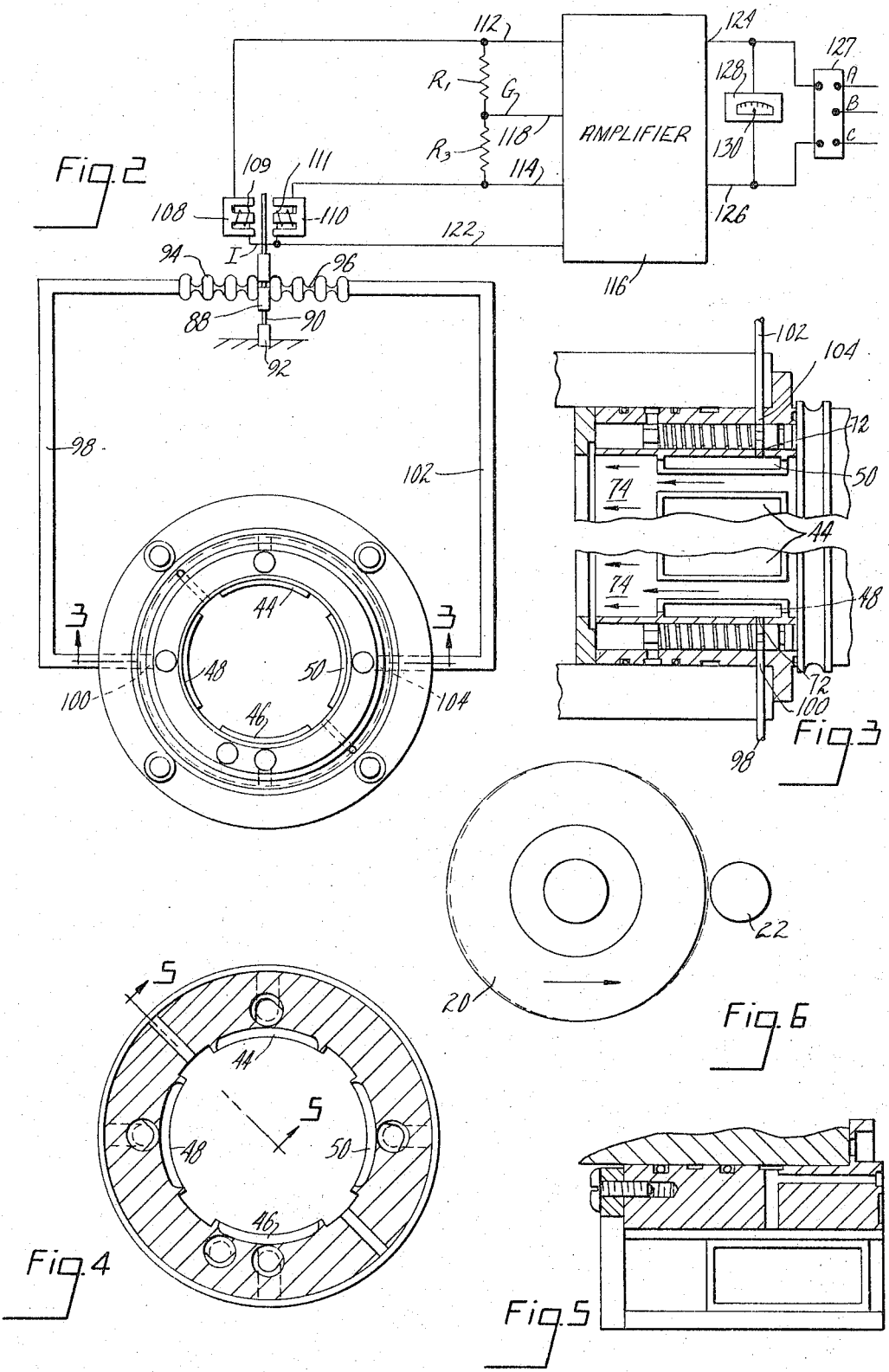

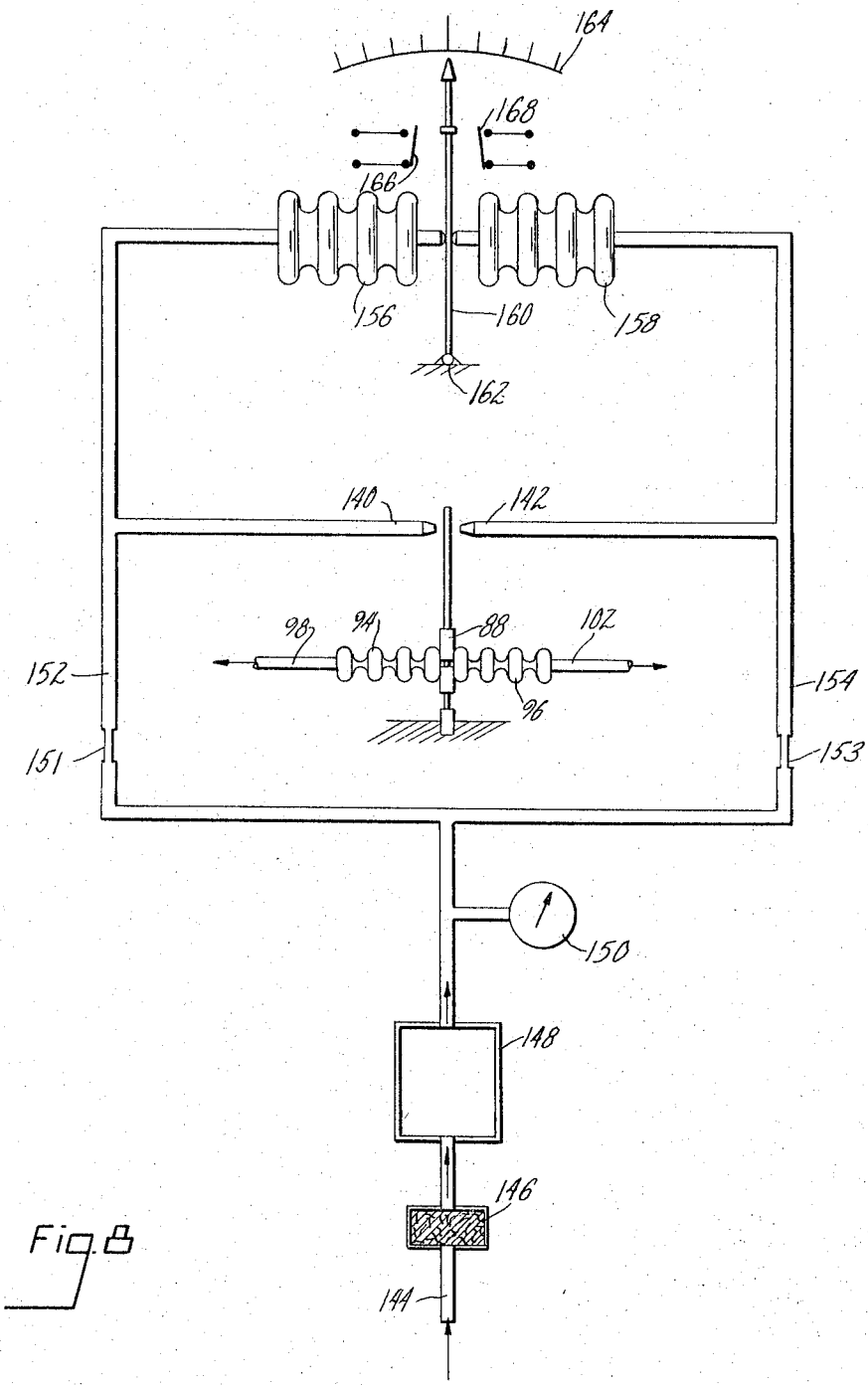

United States Patent Office 3,365,711
Patented Jan. 23, 1968

3,365,711
HYDROSTATIC BEARING LOAD
SIGNALING DEVICE
George N. Levesque, Warwick, R.I., assignor to Brown &
Sharpe Mfg. Co., North Kingstown, R.I., a corporation
of Rhode Island
Filed Apr. 8, 1965, Ser. No. 446,615
6 Claims. (Cl. 340—269)

The present invention relates to a hydrostatic bearing load signaling device.

It is a principal object of the invention to provide a novel device which will detect and will signal instantly the slightest variation in the loading of a hydrostatically supported spindles, as, for example, the variation in the loading of a hydrostatically supported grinding wheel spindle which occurs when the grinding wheel engages the work.

It is more specifically an object of the invention to provide a differential hydrostatic pocket pressure sensing device in combination with suitable signal amplifying and signal applying devices which are well adapted for giving visual indication of such load unbalance, and for the automatic performance of such functions related to the machine operation as may be desired.

With these and other objects in view as may hereinafter appear, the several features of the invention will be readily understood by one skilled in the art from the following description taken in connection with the accompanying drawings in which:

FIG. 2 is a view of front bearing box taken on a line 2—2 of FIG. 1 with the spindle removed; illustrating additionally the fluid differential pressure sensing device connected with two opposed hydrostatic pockets of the spindle bearing, together with a hydraulic pressure-electrical transducer, signal amplifying means, and associated signal indicating means;

FIG. 3 is a detail plan section taken on a line 3—3 of FIG. 2 illustrating particularly the connection of the sensing lines with two opposed hydrostatic pockets;

FIG. 4 is a sectional view taken on a line 4—4 of FIG. 1;

FIG. 5 is a detail sectional view taken on a line 5—5 of FIG. 4;

FIG. 6 is a somewhat fragmentary end view of the grinding wheel and grinding wheel spindle as shown in FIG. 2, but on a smaller scale illustrating the manner in which the grinding wheel is moved into engagement with a rotating work piece;

FIG. 8 illustrates a modification in which the signal produced by the differential sensing device is amplified for visual representation and for electrical take off by means of a hydraulic-to-compressed air transducer and amplifying device.

Figure 1:
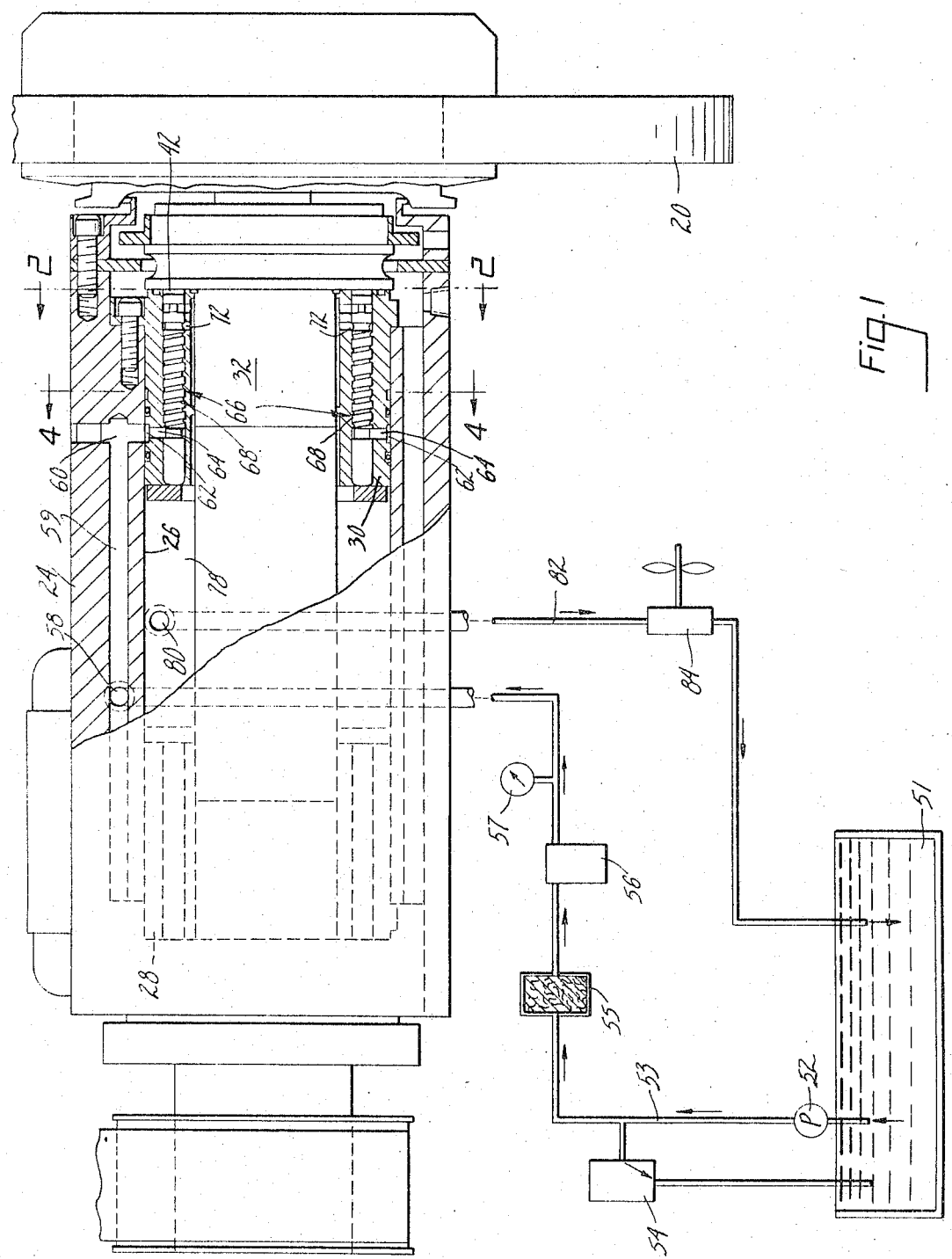
FIG. 1 is a view in side elevation partly in section of a hydrostatically supported grinding wheel spindle and grinding wheel illustrating somewhat diagrammatically the flow circuit of the hydrostatic fluid.

The invention is herein disclosed in a preferred form as embodied in a hydrostatic spindle bearing assembly for a rotary grinding machine in which the grinding wheel 20 is moved toward and away from a rotating cylindrical work piece generally indicated at 22 (see FIG. 6). The bearing assembly comprises a cylindrical housing 24 having formed therein a bore 26 to receive two sleeve bearing members 28, 30 which are mounted in spaced relation to one another providing support for a rotating spindle 32 and the grinding wheel 20 mounted thereon. The spindle 32 is formed with two cylindrical radial bearing surfaces which cooperate with internal radial bearing support surfaces formed in the sleeve bearing members 28, 30. The internal bearing support surfaces referred to are recessed to provide hydrostatic pockets, the nonrecessed portions being of such diameter as to provide a clearance between the rotating and stationary elements of the bearings which will permit a restricted flow of pressure fluid from the pocket forming recesses outwardly over the edges of said pockets. The spindle 32 is formed with additional axial thrust hydrostatic bearing faces formed respectively on outwardly extending flanges at each end of the spindle which cooperate with annular axial thrust hydrostatic pocket forming grooves in the adjacent end faces of the respective sleeve bearing members, of which the right hand pocket forming groove 42 in the end face of sleeve bearing member 30 is shown. The sleeve bearing member 30 adjacent to and carrying the major portion of the load imposed by the grinding wheel 20 is recessed to provide four hydrostatic pockets 44, 46, 48 and 50. Similar hydrostatic pockets formed in the left hand spindle bearing member 28 are not shown since this bearing is substantially similar to the right spindle bearing and forms specifically no part of the invention. As clearly shown in FIG. 4, the hydrostatic pockets in the right hand sleeve bearing member 30 adjacent the grinding wheel 20 comprise an upper pocket 44, a lower pocket 46, and two horizontally opposed pockets 48, 50.

High pressure oil is supplied to the hydrostatic pressure pocket forming recesses 44, 46, 48 and 50 through a pressure oil supply system, which comprises a reservoir 51 from which hydrostatic pressure fluid is forced by means of a pump 52 through a pipe line assembly 53 which includes a relief valve 54, a filter 55, an accumulator 56 and a pressure gage 57. At its upper end the pipe line 53 is connected with a port 58 which connects to a longitudinally extending manifold in the form of an axial bore 59 in the housing. Oil passes from the manifold 59 through a radial passage 60 into an annular groove 62 formed in the peripheral surface of the sleeve bearing member 30, and thence through four radial passageways 64 and pressure reducing units 66 connected thereto to the several pocket forming recesses 44, 46, 48 and 50. As shown, for example, in FIG. 1, the pressure reducing units 66 referred to each comprise an axially disposed plug 68 mounted in an axial bore in the sleeve bearing member 30. A spiral pressure reducing groove formed on the periphery of the plug 68 is connected at one end to the radial passageway 64 and at its other end to an inlet 72 for the respective pocket forming recesses. It will be understood that the inlet pressure admitted through the radial passage 60 may be in the order of 400 p.s.i. which is subsequently reduced during the passage through the pressure reducing units 66 to an approximate 200 p.s.i. for use as a hydrostatic cushion in each of said pressure bearing pockets 44, 46, 48 and 50.

The oil supplied under pressure to the hydrostatic pressure pocket forming recesses 44, 46, 48 and 50 flows outwardly from the pockets through the clearance spaces provided between the rotating spindle and the non-recessed edges of the pockets into recessed drainage spaces surrounding said pockets generally designated at 74 in FIG. 3 and drains into the central drainage chamber 78 provided between the two sleeve bearing members 28, 30 from which it is returned through an outlet 80 and return pipe 82 to the reservoir 51. An oil cooling unit 84 is shown in the return pipe line 82.

It has been found that if the load on the grinding wheel and spindle becomes unbalanced, the spindle tends to be forced from its equilibrium axis. The oil pressure in the hydrostatic pressure pockets which support the spindle against such movement will become unbalanced. Oil pressure will build up in the more heavily loaded hydrostatic pressure pocket tending to produce a balancing force which resists the displacement of the spindle. At the same time, in the opposite hydrostatic pressure pocket, there is a decrease in oil pressure. A pressure differential is thus produced which tends to re-align the spindle.

I have found that the differential fluid pressure built up within two opposed hydrostatic pressure pockets as a result of the loading of the grinding wheel and spindle provides an extremely sensitive and accurate gage of the load carried by the bearing, the extent of said differential fluid pressure being a measure of said loading of the grinding wheel and spindle.

My improvement consists in the provision of a differential pressure sensing device having pressure sensing pipe connections with each of two opposed hydrostatic pressure pockets of the general type described, whereby an extremely sensitive and accurate signal is produced which faithfully reflects even the slightest variation or differential in pressure which may appear as a result of loading the grinding wheel. The signal thus produced is amplified and may be employed by the operator for the making of adjustments which may be indicated in the grinding process, or may be utilized for the automatic performance of certain machine operations as may be desired.

Referring to FIGS. 2 and 3, the differential pressure sensing device provided in accordance with the invention comprises an armature 88 supported in a vertical position by means of a leaf spring 90 secured at its lower end to a base 92. The armature 88 is engaged at each side thereof by two bellows 94, 96, the bellows 94 being connected by means of a hydraulic pressure sensing pipe line 98, and a port 100 with the downstream end of the associated pressure reducing element 66 and with the hydrostatic pressure pocket 48. The bellows 96 is similarly connected by a hydraulic pressure sensing pipe line 102 with a port 104 connecting with the downstream end of the associated hydraulic pressure reducing unit 66 and hydrostatic pressure pocket 50.

Any movement transmitted to the armature 88 of the differential pressure sensing device illustrated in FIG. 2 is picked up electrically by a pair of transducer coils, 109, 111 mounted on E-cores, 108, 110 located at opposite sides of a metallically coated portion of the armature 88, and a voltage dividing network consisting of resistances R1 and R3 on which there is impressed a voltage which may be in the order of 3.5 volts supplied by wires 112, 114 from the secondary of a transformer, not shown, forming part of a conventional amplifier generally indicated at 116. The resistances R1 and R3 are connected to ground by a wire G. Any movement of the transducer armature 88 toward one or the other of said E-cores 108, 110 causes a voltage output to appear between the ground wire G and the junction I between the transducer coils 109, 111. This output voltage is applied to the input line 122 of the amplifier 116, the amplified output from which is transmitted through connections 124, 126 through a visual meter 128 having a pointer 130 which indicates both the direction and extent of the movement impressed on the armature 88 by the different pressure sensing device above described. The wires 124, 126 are also connected to a relay 127 with three take-off terminals A, B and C by means of which other machine functions as, for example, the slowing of the advance of the grinding wheel against the work may be readily accomplished.

Figure 7:
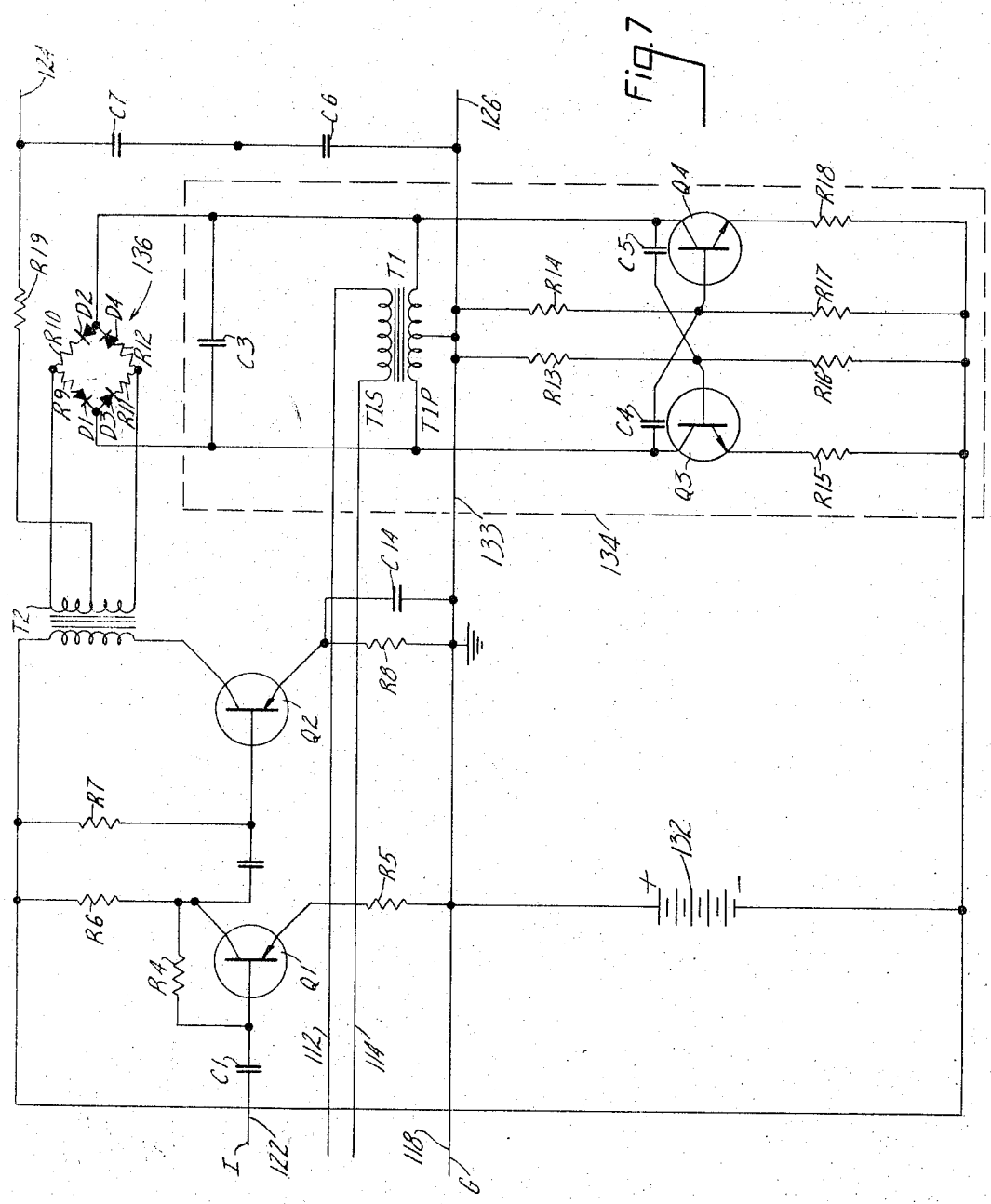
FIG. 7 is an electrical diagram of the amplifier illustrated in FIG. 2 of the drawings.

FIG. 7 is a schematic diagram of the electronic amplifier unit. The device is powered by a well regulated direct current source represented by a battery 132 having a connection 133 with the primary TIP of a transformer TI.

Transistors Q3 and Q4 form an oscillator 134 which generates about 6 volts alternating voltage in the transformer primary TIP. Capacitor C3 acts to tune the oscillator 134 to about 7000 cycles per second. Resistors R13 and R16 serve to properly bias transistor Q3 while R14 and R17 bias Q4. Resistors R15 and R18 limit the current flow in the two transistors and thereby control the amplitude. Capacitors, C4 and C5, supply the regenerative coupling which drives each transistor alternately.

The oscillator transformer primary TIP directly supplies a reference voltage to a ring connected demodulator bridge 136 made up of the four diodes d1 through d4 and the four resistors R9 through R12.

The oscillator transformer secondary winding TIS supplies about 3.5 volts excitation through connections 112, 114 across the two transducer coils 109 and 111 and also to the voltage dividing network R1, R3.

As the transducer armature 88 is moved between the two E-cores a voltage output appears between the ground point "G" and the junction "I," between 109 and 111. This output voltage is applied to the base of transistor Q1 through the coupling capacitor C1. Transistors Q1 and Q2 and the associated components comprise a conventional audio frequency amplifier which strengthens the signal and through transformer T2 applies the amplified signal to the demodulator bridge 136. The demodulated output is fed to the meter 128 through a resistor R19 which together with the capacitors, C6 and C7, remove most of the 14,000 c.p.s. ripple which results from demodulating the 7000 cycles per second signal.

The filter, comprising R19 and the capacitors C6 and C7, is designed to allow the indication of quite rapidly varying signals from the transducer which results from bearing load variations.

FIG. 8 illustrates an alternative form of a differential pressure sensing and measuring device in which the unbalance signal produced by the differential pressure sensing device is picked up and amplified by a hydraulic pressure to pneumatic pressure transducer and amplifier to effect a highly sensitive and accurate indication of differential pressures set up in opposed hydrostatic pressure bearing pockets as a measure of the loading of a grinding wheel and spindle supported thereby. In this form of the device, the armature 88, controlled by the bellows 94 and 96 and sensing pipe lines 98 and 102, is disposed at its upper end between two compressed air inlet nozzles 140, 142. Compressed air is supplied to the apparatus through a compressed air inlet 144, being passed through an air filter 146, an air pressure regulator 148, and an air pressure gage 150, then to two restrictors 151, 153 and, thereafter, to two separated pipe lines 152, 154 into which are connected the nozzles 140, 142. At their upper ends the pipe lines 152, 154 are connected to two bellows 156 and 158 which contact respectively with opposite sides of a pointer 160 arranged to swing about a pivot 162 with relation to an indicator dial 164. The arrangement is such that movement of the armature 88 has the effect of partially blocking or unblocking the respective nozzles 140, 142 producing a corresponding increase or decrease as may be of the pressure in the associated bellows 156, 158 so that a reading is obtained on the meter dial 164 which is in direct relation to the movement of the sensing armature 88 produced by a differential pressure set up in the opposed hydrostatic pressure pockets 48, 50 by the loading of the grinding wheel and spindle. The compressed air actuated amplifier above described may be readily adapted for automatically controlling various machine functions as, for example, a slow down of the grinding wheel infeed against the work by means of electrical connections including two normally opened switches 166, 168 which are adapted to be closed respectively by movement of the dial indicator 160 to the left or to the right as the case may be.

While in the preferred embodiments of the invention illustrated, the hydrostatic pressure sensing elements have been connected only with a single pair of hydrostatic pockets located at horizontally opposed sides of the spindle for the detection and signalling of changes in loading in a horizontal direction produced, for example, by the engagement of a spindle supported grinding wheel with a work piece, it will be understood that the invention in its broader aspects is not limited to the particular construction shown, but contemplates the attachment of hydrostatic sensing elements to any two hydrostatic pockets or to any two groups of such pockets which are opposed in the sense that movement of the spindle from its axis will produce a pressure differential between said opposed pockets or groups of pockets suitable for sensing and evaluating variations of said loading which may appear in any designated direction radially of the spindle axis.

The invention having been described what is claimed is:

1. The combination of a rotating machine tool spindle having hydrostatic bearings including a housing, hydrostatic pockets disposed in said housing about the periphery of said spindle including pockets spaced apart in locations opposing movement of said spindle from its axis in opposite directions, and means for supplying hydrostatic bearing fluid under pressure to each of said pressure pockets, and a hydrostatic bearing load signaling device comprising a differential pressure take off including hydrostatic pressure sensing elements connected with said spaced apart opposed hydrostatic pockets, and means responsive to any differential pressure variation sensed by said pressure sensing elements to produce a signal, a signal amplifying device, a transducer connected between said differential pressure take off and said signal amplifying device, and visual indicating means connected with said signal amplifying device.

2. A hydrostatic bearing load signalling device according to claim 1, in which said hydrostatic pressure sensing elements comprise hydrostatic pressure containing conduits terminating in opposed closed end expansion elements.

3. A hydrostatic bearing load signaling device for use with a rotating machine tool spindle having hydrostatic bearings including a housing, hydrostatic pockets disposed in said housing about the periphery of said spindle including pockets spaced apart in locations opposing movement of said spindle from its axis in opposite directions, and means for supplying hydrostatic bearing fluid under pressure to each of said pockets having, in combination, a device for indicating any variation of pressure differential between said spaced apart opposed hydrostatic pockets, comprising hydrostatic pressure sensing elements connected with each of said opposed hydrostatic pockets for which indication is desired, a movable signal producing element supported to be acted upon in opposite directions by said sensing elements, a transducer connected with said indicator to signal any movement of said signal producing element in response to a differential pressure variation set up between said pressure sensing elements, means to amplify said signal, and an operator connected to be actuated by said amplified signal.

4. A hydrostatic bearing load signaling device for use with a rotating machine tool spindle having hydrostatic bearings including a housing, hydrostatic pockets disposed in said housing about the periphery of said spindle including pockets spaced apart in locations opposing movement of said spindle from its axis in opposite directions, and means for supplying hydrostatic bearing fluid under pressure to each of said pockets having, in combination, a device for indicating any variation of pressure differential between said spaced apart opposed hydrostatic pockets, comprising a movable signal producing armature, hydrostatic pressure fluid sensing conduits connected with said spaced apart opposed hydrostatic pockets having means for directing hydrostatic pressure in said spaced apart opposed pockets against said armature in opposed directions, an electronic transducer circuit comprising a pair of coils disposed at opposite sides of said armature, means for applying a voltage to said coils, an electrical amplifier for amplifying the unbalanced voltage signals produced between said coils by movement of said armature, and means for applying said amplified signal.

5. A hydrostatic bearing load signaling device having, in combination, with a rotating spindle a hydrostatic bearing for said spindle including a bearing housing and at least one pair of hydrostatic fluid pressure pockets within said housing arranged to provide hydrostatic pressure support for opposite sides of said spindle, and means supplying hydrostatic bearing fluid under pressure to each of said pressure pockets, a differential hydrostatic fluid pressure sensing device comprising an armature, a bellows at each side of said armature, a sensing pressure line connecting a bellows with each pocket of one of said opposed pressure pocket pairs, a compressed air actuated signal amplifying device comprising a movable signal indicating member, compressed air actuated movers acting yieldably upon said signal indicating member in opposite directions, a compressed air supply connection to each of said movers, and a differential pressure control means for said movers comprising an outlet from each of said supply connections providing air jets directed respectively against opposite sides of said armature.

6. A hydrostatic bearing load signaling device for signaling the loading of a spindle transversely of its axis produced by the engagement of a hydrostatically supported rotating grinding wheel and spindle with a work piece having, in combination with said rotating spindle, a housing, hydrostatic pockets disposed in said housing about the periphery of said spindle including a pair of said pockets located at diametrically opposite sides of said spindle substantially in the direction of said loading displacement of said spindle from its axis and means for supplying hydrostatic bearing fluid under pressure to each of said pockets, a device for indicating any variation of pressure differential between two said hydrostatic pockets opposed to one another at opposite sides of said spindle line of transverse displacement of said spindle comprising a movable signal producing armature, hydrostatic pressure fluid sensing conduits connected with each of said opposed hydrostatic pockets, hydrostatic pressure fluid actuated expansion elements connected with said sensing conduits acting yieldably in opposite directions against said armature, a signal amplifying device, a transducer connected between said armature and said amplifying device for signaling any movement of the armature to said amplifying device, and an operating outlet from said amplifying device for said amplified signal.

References Cited

UNITED STATES PATENTS

| | | | |
|---|---|---|---|
| 2,459,826 | 1/1949 | Martellotti | 308—122 |
| 3,180,661 | 4/1965 | Porath | 308—122 X |
| 3,220,244 | 11/1965 | Donnelly | 73—37.6 |

FOREIGN PATENTS

| | | |
|---|---|---|
| 1,160,652 | 1/1964 | Germany. |

THOMAS B. HABECKER, *Acting Primary Examiner.*

D. L. TRAFTON, *Assistant Examiner.*